3,134,723
METHOD OF REFINING FUNGAL ENZYME PREPARATIONS

Julian Corman, Muscatine, Iowa, assignor to Grain Processing Corporation, Muscatine, Iowa, a corporation of Iowa
No Drawing. Filed Dec. 15, 1961, Ser. No. 159,758
10 Claims. (Cl. 195—66)

The present invention relates to a method of refining fungal enzyme preparations.

During recent years many new and extended uses have been developed for fungal enzymes. The use of fungal enzymes for conversion of starch and dextrins to sweet edible food products such as sweet syrups, dried sugars and crystalline dextrose is but one of the many applications for diastatic fungal enzyme preparations. The production of these fungal enzymes by the cultivation of microorganisms in a liquid nutrient substrate is a well known procedure in the fermentation industry. Conventionally, the nutrient substrate contains as primary nutrient substances a carbohydrate and a source of nitrogen such as nitrates or proteinaceous material. One commonly used procedure for cultivation of the microorganisms is designated submerged aerobic cultivation. In this procedure an agitator is used to disperse air or oxygen which is sparged below the surface (usually near the bottom) of a liquid containing the fermentable nutrients. In other procedures cultivation of the organism is carried out on the unagitated surface of liquid media or on moistened cereal products such as wheat bran which are either spread in shallow layers on trays or agitated in rotating drums. Generally steel or iron vessels are employed in all of the various cultivating procedures, with a definite preference being given to iron vessels by some skilled workers in the art. Usually the culture liquor containing the fungal enzymes obtained by the conventional procedures is dark brown in color due to the presence therein of iron and deleterious chromogenic organic substances. Also the culture liquor generally contains varying quantities of organic acids such as gluconic, oxalic or citric which are usually formed during the fermentation process as well as the aforementioned extraneous chromogenic substances formed during the growth of the fungus. The presence of the iron compounds and chromogenic organic substances as well as the organic acids that are formed in the culture liquor during the production of the diastatic enzymes is particularly undesirable for a number of reasons. The dark iron compounds and other chromogenic substances in the diastatic liquor produce a color in the resultant product that is undesirable from a sales standpoint. In addition, the acids produced during growth of the fungus readily react with metallic ions such as calcium that may be present in the water employed to prepare the starch slurry which is to be saccharified. This results in the formation of a non-sugar residue that appears as an undesirable haze in the final food product. It is thus generally necessary to refine or purify the enzyme preparation in order to obtain a light-colored product containing relatively little or no iron and to remove the organic acids and other undesirable substances which may be present therein.

Conventional methods for refining the fungal enzyme preparations usually involve a dialysis, absorption or precipitation procedure. A major disadvantage of the dialysis procedure is that the volume of the enzyme solution is greatly increased which, in commercial production of the enzymes, results in higher transportation costs. Of course, subsequent to the dialysis purification procedure an additional evaporation operation could be employed to reduce the volume of liquid, but this would also add to the cost of producing the fungal enzymes. Moreover, it is not feasible to employ ordinary tap water in the dialysis purification procedure since ordinary tap water may contain metallic ions that are precipitable by the organic acids present in the enzyme culture liquor to form insoluble salts which clog the pores of the dialysis membranes.

In absorption purification techniques the fungal enzymes are absorbed on an absorbent such as aluminum hydroxide, phosphate gels, kaolin and the like and then eluted therefrom. In precipitation purification procedures the fungal enzymes themselves are precipitated from the culture liquor by means of precipitating agents such as ammonium sulphate, acetone, methyl, ethyl or isopropyl alcohols, etc. and then redissolved. These prior art refining procedures are quite costly since they require special equipment and relatively expensive reagents to accomplish the purpose. Accordingly an improved method for purifying fungal enzyme preparations which is easy to carry out and which is low in cost is highly desirable.

The present invention provides an improved and economical method for refining fungal enzyme preparations to produce a relatively pure enzyme preparation which is substantially free of contaminants usually present therein and which has a desirably light color.

In accordance with the present invention it has been found that it is possible to effectively refine or purify fungal enzyme preparations by treating the liquor obtained from the cultivation of the organisms with a cation selected from the group consisting of barium, calcium, strontium, cadmium, lead, manganese and zinc. It has been found that by treating the culture liquor with the specified cations, contaminants present in the culture liquor such as the organic acids gluconic, oxalic or citric, iron and other undesired extraneous substances formed during the growth of the fungus can be effectively removed therefrom without an appreciable adverse effect on the enzyme.

The specified cations upon addition to the culture liquor react with the organic acids present therein to form insoluble salts which readily precipitate from solution. The gelatinous precipitate which is formed not only includes the insoluble salts of the organic acids but also occludes substantial proportions of other undesired contaminants found in the culture liquor such as iron, mannitol, chromogenic substances, and the like. The precipitate containing the undesired contaminants is separated from the culture liquor by any convenient means such as filtration, decantation, centrifugation and the like. In contrast to what would normally be expected, it has been found that there is no appreciable loss in enzyme potency of the culture liquor by treatment in this manner. The gelatinous precipitate formed by reaction of the cation treating agents with the organic acids removes from the culture liquor only a negligible amount, if any, of the fungal enzymes capable of converting starch or dextrins to glucose.

The cation treating agents are preferably employed in the form of their water soluble salts. Exemplary of these salts are barium bromide, barium chloride, barium nitrate, calcium bromide, calcium chloride, calcium nitrate, strontium bromide, strontium chlorate, strontium nitrate, lead acetate, manganese acetate, manganese iodide, manganese sulfate, zinc sulfate, zinc chloride, and the like.

In one preferred embodiment of the invention, treatment of the fungal enzyme culture liquor is effected by titrating the culture liquor with an aqueous solution of a salt of the specified cations. The titration is continued until no further precipitation occurs upon addition of the salt solution. By employing this titration procedure the proper amount of the cation to employ is accurately determined and the use of a large excess is avoided. In an alternative procedure salts of the specified cations are added in dry form to enzyme culture liquor.

Preferably the pH of the culture liquor is adjusted to a pH in the range from about 4.5 to 8.5 before treatment with the cations in accordance with the invention. Adjustment of the pH to within the desired range is readily accomplished by adding to the culture liquor a suitable amount of a base such as sodium hydroxide, ammonium hydroxide and the like.

The following examples illustrate a preferred method of the present invention for refining fungal enzyme preparations and show clearly the advantages of the invention.

EXAMPLE I

A sample of *Aspergillus niger* GPC-124 culture filtrate produced by submerged aerated fermentation in a 20,000 gallon carbon steel fermentor had a dark brown color. It was desired to purify this enzyme preparation so as to obtain a light-colored product substantially free of organic acids. The pH of the culture filtrate was first adjusted to about 6.0 with sodium hydroxide solution and the sample filtrate was divided into five aliquots to each of which was added varying amounts of calcium chloride ($CaCl_2$) as a 25 percent aqueous solution. The following table shows the results obtained when the filtrates were assayed after removal of the copious precipitate formed upon addition of the alkaline earth salt to the dark brown culture filtrate.

*Table I*

| Aliquot Number | Initial pH | $CaCl_2$ added (percent) | pH after $CaCl_2$ addition | Iron (p.p.m.) | Diastatic potency, units/ml. |
|---|---|---|---|---|---|
| 1 | 6.00 | 0 | 6.00 | 2,184 | 1.20 |
| 2 | 6.00 | 0.25 | 5.55 | 1,484 | 1.15 |
| 3 | 6.00 | 0.50 | 5.35 | 838 | 1.16 |
| 4 | 6.00 | 1.00 | 5.25 | 286 | 1.15 |
| 5 | 6.00 | 1.50 | 5.15 | 292 | 1.17 |

Further addition of calcium chloride solution to aliquot number 5 did not produce any additional precipitate thus indicating substantially complete removal of organic acids such as gluconic, oxalic and/or citric acids. As noted in Table I, only 2.5 percent of the diastatic potency was lost by this precipitation procedure (which in the enzyme assay procedure employed is within the limits of experimental error) whereas practically 87 percent of the iron was removed. The culture filtrate after treatment with the calcium chloride solution was light yellow in color in contrast to the dark brown color of the original culture filtrate.

EXAMPLE II

A sample of *Aspergillus niger* GPC-124 culture filtrate produced by submerged aerated fermentation in a 20,000 gallon carbon steel fermentor had a dark brown color. An aliquot was assayed for diastatic enzyme potency and iron content while the pH of a second portion was adjusted to 6.5 with a solution of calcium hydroxide $Ca(OH)_2$. A 25 percent calcium chloride ($CaCl_2$) solution was then added to various aliquots which were each assayed for enzyme potency and iron content after removal of the resultant precipitates. The results are shown in Table II.

*Table II*

| Aliquot | $Ca(OH)_2$ added (percent) | $CaCl_2$ added (percent) | Iron (p.p.m.) | Diastatic Potency, units/ml. |
|---|---|---|---|---|
| 1 | 0 | 0 | 1643 | 2.30 |
| 2 | 0.62% to pH 6.5 | 0.4 | 58 | 2.32 |
| 3 | 0.62% to pH 6.5 | 0.6 | 58 | |
| 4 | 0.62% tp pH 6.5 | 0.8 | 64 | 2.32 |

Further addition of calcium chloride solution to the supernatant liquid from aliquot number 4 failed to produce any additional precipitate thus indicating substantially complete removal of organic acids. In addition 96 percent of the iron was removed by this treatment with no loss in enzymatic activity. The culture filtrate after treatment with calcium chloride had a light lemon color.

EXAMPLE III

A sample of *Aspergillus niger* GPC-124 culture filtrate produced similarly to those used in the previous examples was adjusted to pH 6.5 with a solution of sodium hydroxide. To each of three 20 ml. aliquots was added 210 milligrams of either barium chloride ($BaCl_2$), calcium chloride ($CaCl_2$), or strontium chloride ($SrCl_2$) contained in one ml. of solution. One ml. of water was added to a fourth 20 ml. aliquot designated as the control sample. All mixtures were then shaken thoroughly and centrifuged. After adjusting a water blank to read zero optical density at 600 m$\mu$ wave length, the optical densities of the four supernatants (that were similarly diluted) were determined by means of a model B, Beckman spectrophotometer. The optical densities along with corresponding diastatic potencies are shown in Table III.

*Table III*

| Treatment | Optical Density at 600 Millimicrons | Percent Original Opacity | Diastatic Potency, Units/ml. | Percent Original Enzyme Potency |
|---|---|---|---|---|
| Control | 0.215 | 100.0 | 2.34 | 100.0 |
| 1% $BaCl_2$ | 0.066 | 30.7 | 2.28 | 97.4 |
| 1% $CaCl_2$ | 0.081 | 37.7 | 2.19 | 93.1 |
| 1% $SrCl_2$ | 0.134 | 62.3 | 2.27 | 97.0 |

Example IV

Another sample of *Aspergillus niger* GPC-124 culture filtrate produced similarly to those used in the previous examples was adjusted to pH 6.5 with sodium hydroxide. One milliliter of water was added to a 20 milliliter aliquot that was used as the control, while one milliliter of a 21.0 percent solution of each of the compounds calcium acetate, cadmium sulphate, manganous sulphate, lead acetate, stannous chloride and zinc sulphate was added to each of six additional 20 milliliter aliquots. After thorough mixing all samples were centrifuged and the supernatants were then assayed for glucamylase potencies. The supernatants were all similarly diluted and their optical densities determined at 600 millimicrons in a model B Beckman spectrophotometer using a water blank set at zero optical density as the reference standard. The results are listed in Table IV.

*Table IV*

| Treatment | Glucamylase, Units/ml. | Percent Original Activity | Optical Density at 600 Millimicrons | Percent Original Opacity |
|---|---|---|---|---|
| Control | 1.93 | 100.0 | 0.495 | 100.0 |
| 1% $Ca(C_2H_3O_2)_2 \cdot H_2O$ | 1.92 | 99.5 | 0.128 | 25.9 |
| 1% $CdSO_4$ | 1.94 | 100.5 | 0.155 | 31.3 |
| 1% $MnSO_4 \cdot H_2O$ | 1.98 | 102.6 | 0.305 | 61.6 |
| 1% $Pb(C_2H_3O_2)_2 \cdot 3H_2O$ | 1.93 | 100.0 | 0.046 | 9.3 |
| 1% $SnCl_2 \cdot 2H_2O$ | 1.62 | 83.9 | 0.076 | 15.4 |
| 1% $ZnSO_4 \cdot 7H_2O$ | 1.96 | 101.6 | 0.125 | 25.3 |

The data in Table IV indicate that cations specified for use in the present invention removed deleterious chromogenic substances while stannous chloride had an adverse effect on the glucamylase enzyme.

The method of enzyme assay to determine the diastatic potency employed in the foregoing examples consists in determination of the reducing power produced by action of the enzymes at 60° C. on an acid liquefied starch substrate, adjusted to 4 percent solids concentration and buffered at pH 4.30. One unit of diastatic activity produces reducing power equivalent to one gram of dextrose per hour under these conditions.

It is seen from the foregoing experiments that the method of the present invention, which involves treatment of enzyme culture liquors with certain cations, is particularly effective for refining such culture liquors to remove therefrom undesirable contaminants. With the method of the present invention organic acids which are ordinarily formed during the cultivation of the microorganisms and which are present in the culture liquor can be removed therefrom at low cost. Moreover, iron which may also be present in the culture liquor can be removed therefrom and a light colored product obtained. Of particular significance is the fact that these undesired contaminants are readily removed from the culture liquor in substantially quantitative amounts by the method of the invention without appreciable loss in the diastatic potency of the culture filtrate i.e. loss of the fungal enzymes.

The foregoing examples illustrate a preferred method of the present invention as applied to the treatment of a culture liquor containing a microorganism of the genus Aspergillus. It is clear, however, that the present invention is generally applicable to the treatment of enzyme culture liquors which may contain microorganisms of various genera such as, for example, those of the genus Mucoracae, Rhizopus, Aspergillus and the like. It is also apparent that the method of the present invention is applicable for treating culture liquors which contain iron or contaminants other than the undesired organic acids.

Those modifications and equivalents which fall within the spirit of the invention and the scope of the appended claims are to be considered part of the invention.

I claim:

1. A method of purifying a fungal enzyme culture liquor at a pH from about 4.5 to about 8.5 which comprises treating the culture liquor with a cation selected from the group consisting of barium, calcium, strontium, cadmium, lead, manganese and zinc to form a precipitate containing undesired contaminants and separating the precipitate from the culture liquor.

2. A method of purifying a fungal enzyme culture liquor at a pH from about 4.5 to about 8.5 which comprises treating the culture liquor with a water soluble salt of barium to form a precipitate containing undesired contaminants and separating the precipitate from the culture liquor.

3. A method of purifying a fungal enzyme culture liquor at a pH from about 4.5 to about 8.5 which comprises treating the culture liquor with a water soluble salt of strontium to form a precipitate containing undesired contaminants and separating the precipitate from the culture liquor.

4. A method of purifying a fungal enzyme culture liquor which comprises treating the culture liquor at a pH from about 4.5 to about 8.5 with a water soluble salt of calcium to form a precipitate containing undesired contaminants and separating the precipitate from the culture liquor.

5. A method of purifying a fungal enzyme culture liquor which comprises treating the culture liquor at a pH from about 4.5 to about 8.5 with a water soluble salt of cadmium to form a precipitate containing undesired contaminants and separating the precipitate from the culture liquor.

6. A method of purifying a fungal enzyme culture liquor which comprises treating the culture liquor at a pH from about 4.5 to about 8.5 with a water soluble salt of lead to form a precipitate containing undesired contaminants and separating the precipitate from the culture liquor.

7. A method of purifying a fungal enzyme culture liquor at a pH from about 4.5 to about 8.5 which comprises treating the culture liquor with a water soluble salt of manganese to form a precipitate containing undesired contaminants and separating the precipitate from the culture liquor.

8. A method of purifying a fungal enzyme culture liquor at a pH from about 4.5 to about 8.5 which comprises treating the culture liquor with a water soluble salt of zinc to form a precipitate containing undesired contaminants and separating the precipitate from the culture liquor.

9. A method of purifying a fungal enzyme culture liquor which comprises adjusting the pH of the culture liquor to a value of about 6, and then treating the culture liquor with a water soluble salt of metal selected from the group consisting of barium, calcium, strontium, cadmium, lead, manganese and zinc to form a precipitate containing undesirable contaminants, and then separating the precipitate from the culture liquor.

10. A method of purifying a fungal enzyme culture liquor at a pH from about 4.5 to about 8.5 which comprises titrating the culture liquor with an aqueous solution of a soluble salt of metal selected from the group consisting of barium, calcium, strontium, cadmium, lead, manganese and zinc to form a precipitate containing undesirable contaminants, continuing the titration with the salt solution until no further precipitate forms, and separating the precipitate from the culture liquor.

References Cited in the file of this patent

UNITED STATES PATENTS

| | | |
|---|---|---|
| 2,072,919 | Zender | Mar. 9, 1937 |
| 2,848,371 | Yoshida | Aug. 19, 1958 |
| 3,078,217 | Batti et al. | Feb. 19, 1963 |